United States Patent
Moulin et al.

(10) Patent No.: US 7,864,728 B2
(45) Date of Patent: Jan. 4, 2011

(54) METHOD OF ALLOCATING SUBBANDS TO STREAMS OF A MULTICHANNEL LINK IN A MULTICARRIER MODULATION COMMUNICATIONS SYSTEM

(75) Inventors: Fabienne Moulin, Trevou Treguignec (FR); Mohamed Tlich, Lannion (FR); Bastien Lamer, Lannion (FR); Eric Debeau, Lannion (FR)

(73) Assignee: France Telecom, Paris (FR)

( * ) Notice: Subject to any disclaimer, the term of this patent is extended or adjusted under 35 U.S.C. 154(b) by 340 days.

(21) Appl. No.: 11/887,091
(22) PCT Filed: Mar. 21, 2006
(86) PCT No.: PCT/FR2006/050245
§ 371 (c)(1), (2), (4) Date: Oct. 31, 2008
(87) PCT Pub. No.: WO2006/100408
PCT Pub. Date: Sep. 28, 2006

(65) Prior Publication Data
US 2009/0052383 A1    Feb. 26, 2009

(30) Foreign Application Priority Data
Mar. 23, 2005 (FR) .................................. 05 02857

(51) Int. Cl.
H04W 4/00 (2009.01)
(52) U.S. Cl. ..................................................... 370/329
(58) Field of Classification Search .................. None
See application file for complete search history.

(56) References Cited

U.S. PATENT DOCUMENTS 5,479,447 A    12/1995 Chow et al.

(Continued)

FOREIGN PATENT DOCUMENTS

EP    0 753 948 A    1/1997
WO    WO 01/20865    3/2001

OTHER PUBLICATIONS

S. Kourtis, "Optimum bit allocation algorithm for DMT-based systems under minimum transmitted power constraint", Electronics Letters, vol. 35, No. 25, pp. 2181-2182, Dec. 9, 1999.

Primary Examiner—Chirag G Shah
Assistant Examiner—Amarnauth Persaud
(74) Attorney, Agent, or Firm—Cohen Pontani Lieberman & Pavane LLP

(57) ABSTRACT

A method of allocating a plurality of subbands to a plurality of streams of a multichannel link in a multicarrier modulation communications system, each stream being successively defined in a communications frame of said multichannel link by a number $M_j$ of bits to be transmitted and a noise margin $\Gamma_j$. Each subband is associated with a normalized signal-to-noise ratio on the multichannel link. The subbands are classified in a specific order of the normalized signal-to-noise ratios. An energy $E_i$ per subband is determined by a binary allocation algorithm. For each stream taken in the order of said frame, a number $N_j$ of consecutive subbands taken in the order of normalized signal-to-noise ratios is allocated so that the sum of the numbers $n_{ij}$ of bits in each subband allocated to each stream is equal to $M_j$ where:

$$M_j = \sum_{i=1}^{N_j} n_{ij}$$

and $n_{ij} = \log_2(1 + E_i \cdot (SNR_0)_i / \Gamma_j)$.

9 Claims, 3 Drawing Sheets

U.S. PATENT DOCUMENTS

2004/0085939 A1* 5/2004 Wallace et al. .............. 370/335
2004/0184398 A1* 9/2004 Walton et al. ............... 370/203
2007/0177631 A1* 8/2007 Popovic et al. ............. 370/478
2008/0186935 A1* 8/2008 Ling et al. .................. 370/342
2008/0219211 A1* 9/2008 Franceschini et al. ....... 370/330
2009/0262700 A1* 10/2009 Franceschini et al. ....... 370/330

* cited by examiner

| | AS0 | AS1 | LS0 | LS1 |
|---|---|---|---|---|
| T= | $M_1$ | $M_2$ | $M_3$ | $M_4$ |
| | $FL_1$ | $FL_2$ | $FL_3$ | $FL_4$ |
| | (Internet) | (VoIP) | (Digital TV) | (Video conference) |
| | $\Gamma_1$ | $\Gamma_2$ | $\Gamma_3$ | $\Gamma_4$ |

$\Gamma_1 = \Gamma_3 < \Gamma_2 = \Gamma_4$

METHOD OF ALLOCATING SUBBANDS TO STREAMS OF A MULTICHANNEL LINK IN A MULTICARRIER MODULATION COMMUNICATIONS SYSTEM

RELATED APPLICATION

This is a U.S. National Stage of International Application No. PCT/FR2006/050245 filed on Mar. 21, 2006.

This patent application claims priority of French patent application no. 05 02857 filed 21 Mar. 2005, the disclosure content of which is hereby incorporated by reference.

FIELD OF THE INVENTION

The present invention relates to a method of allocating subbands to streams of a multichannel link in a multicarrier modulation communications system.

The invention finds one particularly advantageous application in the field of multicarrier modulation multichannel links, such as xDSL, PLT, or wireless links, in particular for selectively enhancing the quality of service (QoS) of some streams relative to others.

BACKGROUND OF THE INVENTION

It should be remembered that in multicarrier modulation communications systems, in particular in discrete multitone (DMT) multicarrier modulation communications systems, the bandwidth used is divided into subbands $SB_i$, with each subband modulating an independent carrier. The number of bits and the sending power assigned to a subband depend on the constraints imposed on the transmission line in terms of attenuation, stationary noise, etc., and thus vary from one subband to another.

Furthermore, it is known that a multichannel link can transport a certain number of streams $FL_j$ each associated with one channel of the link. For example, an ADSL link divided into seven different channels, namely four high bit rate unidirectional channels AS0, AS1, AS2, AS3 and three low bit rate bidirectional channels LS0, LS1, LS2, is adapted to transmit seven streams. The transport channels of the link must therefore be chosen as a function of the service corresponding to the stream concerned that is to be transported. Thus the downlink streams of Internet or digital television services are transmitted on AS unidirectional channels and Voice over IP (VoIP) or teleconference services and uplink streams of Internet or digital television services are transmitted on LS bidirectional channels.

It is therefore clear that, in multichannel link transmission systems such as ADSL transmission systems, a plurality of services can be offered simultaneously provided that the sum of the numbers $M_j$ of bits to be transmitted in the streams $FL_j$ does not exceed the total bit rate that has been configured for the link.

After synchronization and multiplexing and before distribution of the bits to the subbands $SB_i$, the streams are organized into frames so that the bits of each stream to be transmitted are grouped together and succeed each other in the frame. The following order might therefore be encountered in a frame: $M_1$ bits of the stream $FL_1$ of an Internet service on channel AS0, then $M_2$ bits of the stream $FL_2$ of a digital television service on channel AS1, then $M_3$ bits of the stream $FL_3$ of a VoIP service on channel LS0, then $M_4$ bits of the stream $FL_4$ of a video conference service on channel LS1, and so on.

The distribution of the bits $M_j$ of the streams $FL_j$ between the subbands $SB_i$ is conventionally effected in two stages.

In a first stage, by means of rate adaptive (RA) binary allocation algorithms known in themselves, each subband $SB_i$ is assigned a number $n_i$ of bits that can be transmitted in that subband, given the signal-to-noise ratio of the transmission line for the subband and given also a noise margin $\Gamma$. The higher this noise margin, the more robust the transmission to the various sources of interference on the line, in particular impulse interference, and the higher the quality of service QoS.

A second stage of the distribution procedure allocates the successive bits of the streams of the frame to the subbands $SB_i$ in increasing order of their number $n_i$ of bits. This method of allocating bits is known as the tone ordering method.

A consequence of the nature of the binary allocation algorithms currently used is that the various streams of an ADSL link, for example, can be transmitted only with exactly the same noise margin $\Gamma$, i.e. with the same quality of service QoS.

Now, with some services, such as the VoIP or videoconference services referred to above by way of example, there is an a priori necessity for a higher quality of service than a simple Internet or digital television link.

SUMMARY OF THE INVENTION

One object of the present invention is to provide a method of allocating subbands to streams of a multichannel link in a multicarrier modulation communications system, each stream being successively defined in a communications frame of said multichannel link by a number $M_j$ of bits to be transmitted and a noise margin $\Gamma_j$ enabling the quality of service QoS of some streams to be given preference over others.

This and other objects are attained in accordance with one aspect of the invention directed to a method that comprises the steps of:

a) associating with each subband a normalized signal-to-noise ratio on the multichannel link;

b) classifying the subbands in a specific order of the normalized signal-to-noise ratios;

c) determining an energy $E_i$ per subband by means of a binary allocation algorithm; and d) allocating, for each stream taken in the order of said frame, a number $N_j$ of consecutive subbands taken in the order of normalized signal-to-noise ratios so that the sum of the numbers $n_{ij}$ of bits in each subband allocated to each stream is equal to $M_j$ where:

$$M_j = \sum_{i=1}^{N_j} n_{ij}$$

the number $n_{ij}$ of bits being defined by:

$n_{ij} = \log_2(1 + E_i \cdot (SNR_0)_i / \Gamma_j)$

Thus the invention can assign a higher quality of service QoS to some streams, called preferred streams, by operating on the noise margin at the binary allocation level, the idea being to associate with those preferred streams noise margins higher than those associated with the other streams, called non-preferred streams.

Note that it would be possible to increase the quality of service QoS of the preferred streams by uniformly increasing the noise margin over all the subbands. However, this method would unnecessarily increase the quality of service QoS of the non-preferred streams and most importantly would reduce the bit rate over the link as a whole. In contrast, the method of the invention assigns higher noise margins only to the preferred streams, which limits the loss of performance in terms of bit rate compared to a uniform increase in the noise margin.

To conform to the tone ordering allocation procedure, said particular order is the order of increasing normalized signal-to-noise ratio.

The invention further makes provision for defining rules for allocating subbands that might not have been allocated following application of the method according to the invention. These additional subbands are called the remaining capacity.

According to a first feature of the invention, the step d) is repeated if the number of subbands allocated is less than the total number of subbands, increasing the number $M_k$ of bits to be transmitted in the frame by given streams of constant noise margin by successive incrementations $\Delta M_k = (M_k/\Sigma_k M_k) \cdot \Delta$, where $\Delta$ is a given increment, until all the subbands have been allocated.

The given streams $FL_k$ referred to here are the non-preferred streams in the sense defined above. According to this first feature, the remaining capacity after application of the method of the invention is therefore shared by the non-preferred streams pro rata the numbers $M_k$ of bits each of them is initially to transmit.

In a variant of this first feature, the step d) is repeated if the number of subbands allocated is less than the total number of subbands by successive dichotomies from an initial interval $[M_{inf}, M_{sup}]$ where $M_{inf}$ is equal to the total number $\Sigma_j M_j$ of bits to be transmitted by all the streams and $M_{sup}$ is equal to the total number of bits to be transmitted in the frame by given streams with a noise margin lower than the minimum margin of said given streams, the number $M_k$ of bits to be transmitted in the frame by the given streams of constant noise margin being increased on each dichotomy by an amount $\Delta M_k = (M_k/\Sigma_k M_k) \cdot (M_c - M_{inf})$, where $M_c$ is the mid-point of the preceding dichotomy interval, until all the subbands have been allocated.

According to a second feature relating to the allocation of the remaining capacity of the subbands, the step d) is repeated if the number of subbands allocated is less than the total number of subbands, with the noise margin of given streams increased by successive incrementations by an increment, until all the subbands have been allocated.

The given streams $FL_1$ referred to here are the preferred streams in the sense defined above. According to this second feature, the remaining capacity after application of the method of the invention is therefore shared between the preferred streams by increasing their noise margin $\Gamma_1$ by a constant amount $\Delta\Gamma$ until the maximum capacity of all the subbands is reached.

In a variant of this second feature, the step d) is repeated if the number of subbands allocated is less than the total number of subbands, increasing the noise margin of given streams by an amount calculated by successive dichotomies from an initial amount $\Delta\Gamma_c = (\Delta\Gamma_{inf} + \Delta\Gamma_{sup})/2$ with $\Delta\Gamma_{inf} = 0$ and $\Delta\Gamma_{sup}$ equal to a sufficiently high value until all the subbands have been allocated.

The invention also provides a computer program product comprising program code instructions for executing the steps of the method according to the invention when said program is executed in a computer, and a medium for said computer program.

According to an embodiment of the invention, a distribution module for the subbands of a transmitter of a multichannel link is noteworthy in particular in that it comprises means for implementing the method according to the invention. Similarly, a transmitter of a multichannel link is noteworthy in that it comprises the distribution module according to the invention.

DETAILED DESCRIPTION OF THE DRAWINGS

Figures 1, 2:
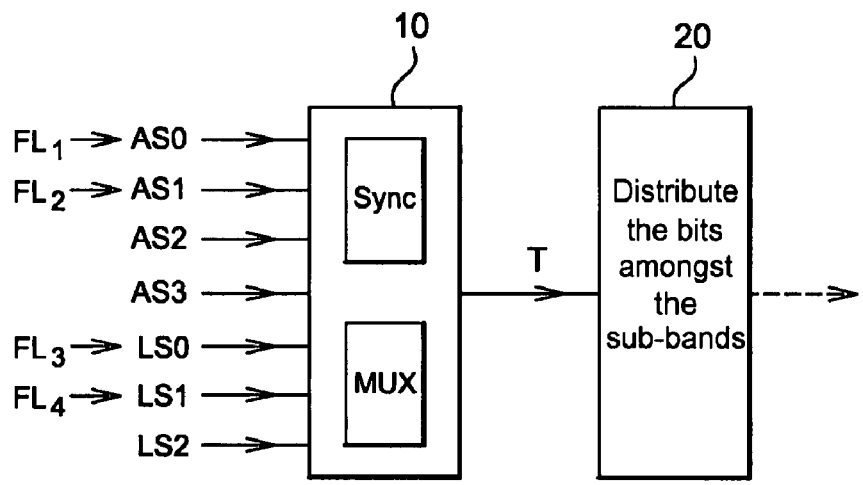
FIG. 1 is a diagram of a transmitter of an ADSL multichannel link in a multicarrier modulation communications system.
FIG. 2 is a diagram of a frame to be transmitted on the multichannel link from FIG. 1.

FIG. 1 is a diagram of a transmitter of an ADSL link in a multicarrier modulation communications system. As already indicated above, this link includes seven channels, namely four high bit rate unidirectional channels AS0 to AS3 and three low bit rate bidirectional channels LS0 to LS2. In the selected example shown in FIGS. 1 and 2, only four streams are transmitted over the link: the streams $FL_1$ and $FL_2$ on the channels AS0 and AS1 and the streams $FL_3$ and $FL_4$ on the channels AL0 and AL1. As FIG. 2 shows, these streams are respectively associated with Internet services (downlink streams), VoIP services, digital television and Internet services (uplink streams), together with digital television services (downlink streams), and videoconference services.

These streams are processed by a first unit 10 in which they are synchronized and multiplexed in one or the other of two different buffer memories called the fast buffer and the interleaved buffer. The interleaved buffer differs from the fast buffer in that it is possible to correct transmission errors, although this possibility is obtained at the cost of a delay.

Frames consisting in fact of two parts are obtained at the output of the synchronization and multiplexing unit 10: one part contains data from the fast buffer and the other part contains data from the interleaved buffer. Given that the invention makes no distinction between the sources of data, FIGS. 1 and 2 show only one frame T, and it is most important to remember that the data of each stream is grouped successively. Here the order of the streams is $FL_1$, $FL_2$, $FL_3$, and $FL_4$. M1, M2, M3, M4 are the respective bits to be transmitted by each of these streams in the frame T.

Each stream $FL_j$ is transmitted with a noise margin $\Gamma_j$ that depends on the quality it is desired to obtain for the associated service. In the proposed example, the margins $\Gamma_2$ and $\Gamma_4$ could be made higher than the margins $\Gamma_1$ and $\Gamma_3$, digital television and videoconferences demanding a higher quality of service than an Internet or Voice over IP connection.

As shown in FIG. 1, the frame T is then processed by a unit 20 responsible for distributing the bits of the streams of the frame to the subbands of the multicarrier modulation communications system. The invention is specifically concerned with the method of allocating said subbands to the various streams $FL_j$ concerned.

Figure 3:
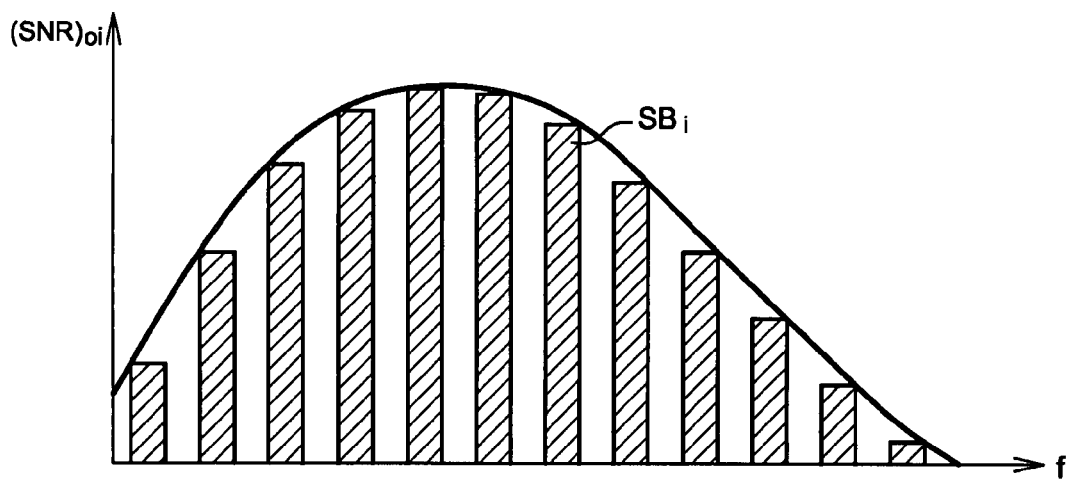
FIG. 3 is a diagram showing the normalized signal-to-noise ratio of subbands classified in increasing frequency order.

The first stage of the allocation method according to the invention associates with each subband $SB_i$ a rationalized signal-to-noise ratio $(SNR_0)_i$. FIG. 3 shows one example of the spectrum of subbands $SB_i$, in which the associated rationalized signal-to-noise ratio $(SNR_0)_i$ is plotted on the ordinate axis.

Figure 4:
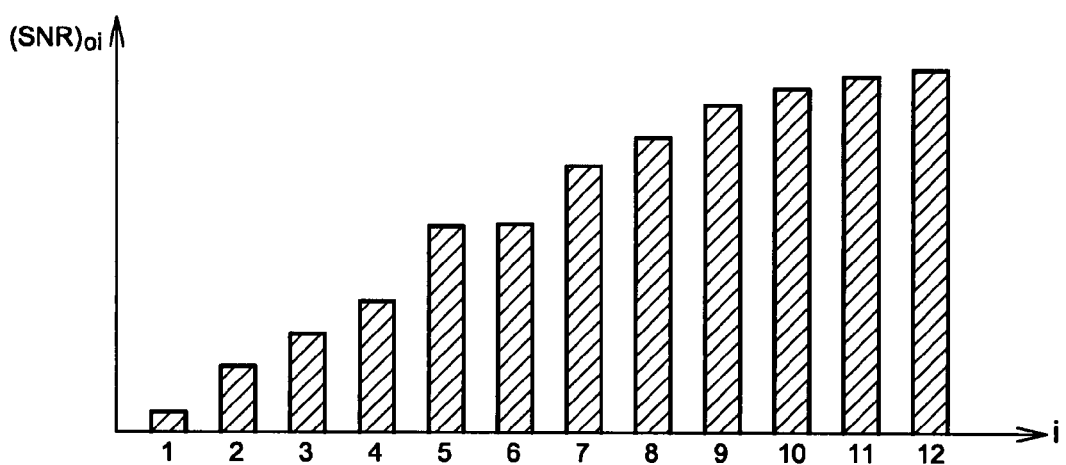
FIG. 4 is a diagram showing the normalized signal-to-noise ratio of the subbands from FIG. 3 classified in increasing standardized signal-to-noise ratio order.

Then, in a second stage, the subbands $SB_i$ are classified in increasing normalized signal-to-noise ratio $(SNR_0)_i$ order. The result of this classification is shown in FIG. 4. By convention, indexing the subbands $SB_i$ by the index i is effected as a function of this classification. The normalized signal-to-noise ratio $(SNR_0)_i$ therefore increases with the index i.

Figure 5:
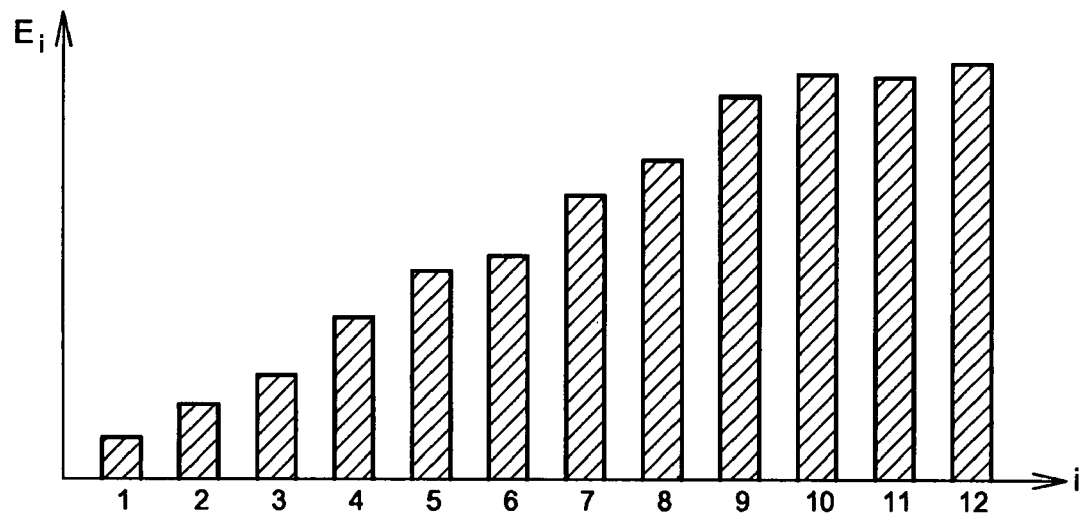
FIG. 5 is a diagram showing the energy assigned to the subbands from FIG. 4.

In a third stage, represented in FIG. 5, a rate adaptive (RA) binary allocation algorithm is applied to the distribution from FIG. 4 in order to determine the energy $E_i$ for each subband $SB_i$, using the same noise margin value, for example the lowest of all those associated with the various streams.

Figure 6:
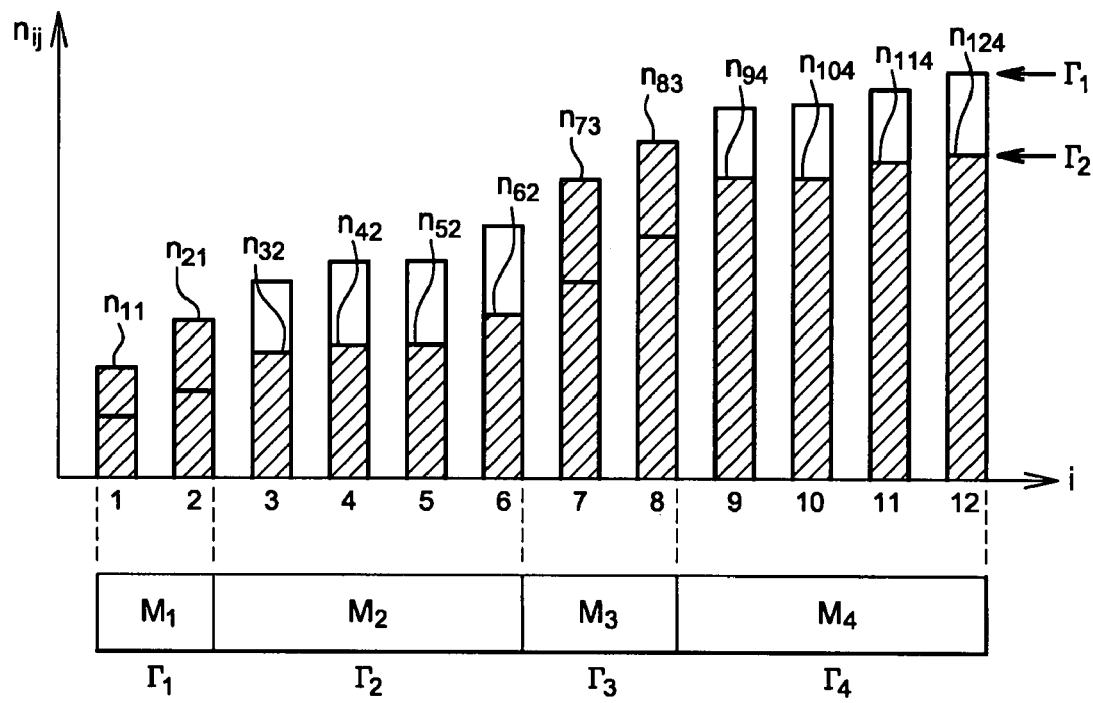
FIG. 6 is a diagram showing the allocation of the streams of the frame from FIG. 1 to the subbands from FIG. 5.

Finally, FIG. 6 shows how the fourth stage of allocating the subbands $SB_i$ to the streams $FL_j$ is effected.

The streams $FL_j$ are taken in the order in which they occur in the frame T and each is allocated a number $N_j$ of consecutive subbands in the order of the normalized signal-to-noise ratios from FIG. 5. The number $N_j$ is determined by the number $M_j$ of bits that must be transmitted by the stream $FL_j$ in the frame. To be more specific, the sum of the numbers $n_{ij}$ of bits in each of the $N_j$ subbands allocated to the stream $FL_j$, given the margin $\Gamma j$ required for that stream, must be equal to $M_j$. $n_{ij}$ is given by the formula:

$$n_{ij} = \log_2(1 + E_i \cdot (SNR_0)_i / \Gamma_j);$$

and $$M_j = \sum_{i=1}^{N_j} n_{ij}.$$

In the FIG. 6 example, $\Gamma_1 = \Gamma_3 < \Gamma_2 = \Gamma_4$. This means that the decision has been made to treat in the same way, in terms of quality of service, firstly, Internet and digital television services and, secondly, VoIP and videoconference services. However, the decision has also been taken to increase the quality of service of the second services relative to the first.

For each subband $SB_i$, it is therefore possible to calculate two values of $n_{ij}$: one, the higher, obtained for $\Gamma_j = \Gamma_1 = \Gamma_3$, the other, the lower, obtained for $\Gamma_j = \Gamma_2 = \Gamma_4$. These two values are represented in FIG. 6.

With regard to the stream $FL_1$, the number of subbands allocated has the value $N_1 = 2$ and $M_1 = n_{11} + n_{21}$. Similarly, for the streams $FL_2$, $FL_3$ and $FL_4$:

$N_2 = 4$ and $M_2 = n_{32} + n_{42} + n_{52} + n_{62}$;

$N_3 = 2$ and $M_3 = n_{73} + n_{83}$;

$N_4 = 4$ and $M_4 = n_{94} + n_{104} + n_{114} + n_{124}$

Once all the streams have been processed, it can happen that the number $\Sigma_j N_j$ of subbands allocated is less than the total number of subbands that exist.

Under such circumstances, the decision can be made to allocate the remaining capacity of the subbands to particular streams, for example to the non-preferred streams of the first allocation, namely the streams $FL_1$ and $FL_3$ whose noise margin is lower than that of the other streams $FL_2$ and $FL_4$, referred to as preferred streams.

To do this, the first step is to increase the number $M_k$ of bits to be transmitted of the non-preferred streams $FL_k$ by an amount $\Delta M_k = (M_k / \Sigma_k M_k) \cdot \Delta$, where $\Delta$ is a given increment. The fourth allocation step as defined above is then repeated.

If, on completion of this operation, all the subbands have been allocated, the process is halted. In contrast, if there still remain unallocated subbands, a further incrementation is effected taking $2\Delta$ as the increment. This process continues until all the subbands have been allocated.

A variant of this remaining capacity allocation method uses a dichotomy approach. The first step is to fix a lower bound $M_{inf}$ and a higher bound $M_{sup}$ for the total number of bits to be transmitted, taking for $M_{inf}$ the total number $\Sigma_j N_j$ of bits to be transmitted by all of the streams $FL_j$ and for $M_{sup}$ the total number of bits to be transmitted in the frame by non-preferred streams $FL_k$ with a noise margin lower than the minimum margin of said non-preferred streams.

On the first dichotomy, the number of bits to be transmitted by each non-preferred stream is increased by a quantity $\Delta M_k = (M_k / \Sigma_k M_k) \cdot (M_c - M_{inf})$ where $M_c$ has the value $(M_{inf} + M_{sup})/2$.

The fourth allocation step of the method described above is repeated, substituting $M_k + \Delta M_k$ for $M_k$ for the non-preferred streams $FL_k$. The process is halted if, on completion of this operation, all the subbands have been allocated. If the number of subbands allocated remains below the total number of subbands to within a fixed integer number, the process is repeated taking the preceding current point $M_c$ as the new lower bound $M_{inf}$. In contrast, if the number of allocations necessary exceeds the total number of subbands, the process continues taking the preceding current point $M_c$ as the new upper bound $M_{sup}$. The successive dichotomies are halted when all the subbands have been allocated to within said fixed integer number.

Another method of allocating the remaining capacity of the subbands first defines preferred streams $FL_1$ which are those for which it was initially decided to increase the quality of service QoS by assigning them a higher noise margin than the other, non-preferred streams. Remember that the preferred streams are the streams $FL_2$ and $FL_4$ in the examples considered above.

According to this other allocation method, a first incrementation by the same amount $\Delta \Gamma$ of the margin $\Gamma_1$ of each preferred stream $FL_1$ is followed by repeating the general step of allocating subbands described above. The process is halted when all the subbands have been allocated. In contrast, if there still remain subbands to be allocated, the process continues with the noise margin of the preferred streams incremented by $2\Delta\Gamma$. This process continues until all the subbands have been allocated.

A variant of this other method of allocating the remaining capacity proceeds by successive dichotomies. For this purpose, a lower bound $\Delta\Gamma_{inf}$ and an upper bound $\Delta\Gamma_{sup}$ are fixed for the noise margin to be added to the noise margins of the preferred streams. We take $\Delta\Gamma inf = 0$ and make $\Delta\Gamma_{sup}$ equal to a value that is sufficiently high in the sense that it is known in advance that the number of subbands obtained with this value will be greater than the total number of subbands available. The first step is to increase the noise margins of all the preferred streams by the amount $\Delta\Gamma_c = (\Delta\Gamma_{inf} + \Delta\Gamma_{sup})/2$, and the subband allocation step is then repeated. The process is halted if all the subbands have been allocated on completion of this operation. If the number of subbands allocated remains below the total number of subbands to within a fixed integer number, the process is repeated taking the preceding current point $\Delta\Gamma_c$ as the new lower bound $\Delta\Gamma_{inf}$. In contrast, if the number of allocations necessary exceeds the total number of subbands, the process continues taking the preceding current point $\Delta\Gamma_c$ as the new upper bound $\Delta\Gamma_{sup}$. The successive dichotomies are halted when all the subbands have been allocated to within said fixed integer number.

The invention claimed is:

1. A method of allocating a plurality of subbands ($SB_i$) to a plurality of streams ($FL_j$) of a multichannel link in a multicarrier modulation communications system, each stream ($FL_j$) being successively defined in a communications frame of said multichannel link by a number $M_j$ of bits to be transmitted and a noise margin $\Gamma_j$, wherein the method comprises the steps of:

a) associating with each subband ($SB_i$) a normalized signal-to-noise ratio $(SNR_0)_i$ on the multichannel link;
   b) classifying the subbands ($SB_i$) in a specific order of the normalized signal-to-noise ratios $(SNR_0)_i$;
   c) determining an energy $E_i$ per subband ($SB_i$) by means of a binary allocation algorithm;
   d) allocating, for each stream ($FL_j$) taken in the order of said frame, a number $N_j$ of consecutive subbands ($SB_i$) taken in the order of normalized signal-to-noise ratios so that the sum of the numbers $n_{ij}$ of bits in each subband ($SB_i$) allocated to each stream ($FL_j$) is equal to $M_j$, where:

$$M_j = \sum_{i=1}^{N_j} n_{ij}$$

the number $n_{ij}$ of bits being calculated from energy $E_i$ and normalized signal-to-noise ratio of i carrier and from noise margin $\Gamma_j$ of stream j.

2. The method according to claim 1, wherein said specific order is the increasing normalized signal-to-noise ratios $(SNR_0)_i$ order.

3. The method according to claim 1, wherein the step d) is repeated if the number of subbands allocated is less than the total number of subbands, increasing the number $M_k$ of bits to be transmitted in the frame by given streams ($FL_k$) of constant noise margin ($\Gamma_k$) by successive incrementations $\Delta M_k = (M_k/\Sigma_k M_k) \cdot \Delta$, where $\Delta$ is a given increment, until all the subbands have been allocated.

4. The method according to claim 1, wherein the step d) is repeated if the number of subbands allocated is less than the total number of subbands by successive dichotomies from an initial interval [$M_{inf}$, $M_{sup}$] where $M_{inf}$ is equal to the total number $\Sigma_j M_j$ of bits to be transmitted by all the streams ($FL_j$) and $M_{sup}$ is equal to the total number of bits to be transmitted in the frame by given streams ($FL_k$) with a noise margin lower than the minimum margin of said given streams, the number $M_k$ of bits to be transmitted in the frame by the given streams ($FL_k$) of constant noise margin ($\Gamma_k$) being increased on each dichotomy by an amount $\Delta M_k = (M_k/\Sigma_k M_k) \cdot (M_c - M_{inf})$, where $M_c$ is the mid-point of the preceding dichotomy interval, until all the subbands have been allocated.

5. The method according to claim 1, wherein the step d) is repeated if the number of subbands allocated is less than the total number of subbands with the noise margin ($\Gamma_1$) of given streams ($FL_i$) increased by successive incrementations by an increment ($\Delta F$) until all the subbands have been allocated.

6. The method according to claim 1, wherein the step d) is repeated if the number of subbands allocated is less than the total number of subbands, increasing the noise margin ($\Gamma_1$) of given streams ($FL_1$) by an amount calculated by successive dichotomies from an initial amount $\Delta\Gamma_c = (\Delta\Gamma_{inf} + \Delta\Gamma_{sup})/2$, with $\Delta\Gamma_{inf} = 0$ and $\Delta\Gamma_{sup}$ equal to a sufficiently high value, until all the subbands have been allocated.

7. A computer program product comprising a non-transitory computer readable medium storing program code instructions for executing the steps of the method according to claim 1, when said program is executed in a computer.

8. A subband hardware distribution module for a transmitter of a multichannel link, comprising means for implementing the method according to claim 1.

9. A transmitter of a multichannel link, comprising the distribution module according to claim 8.

* * * * *